United States Patent [19]

Smith

[11] Patent Number: 5,704,660
[45] Date of Patent: Jan. 6, 1998

[54] LOCKING FASTENER FOR ENCLOSURE COVER

[75] Inventor: Stacy Neil Smith, Holly Springs, N.C.

[73] Assignee: Ericsson Inc., Research Triangle Park, N.C.

[21] Appl. No.: 615,715

[22] Filed: Mar. 13, 1996

[51] Int. Cl.[6] ............................................. E05C 19/06
[52] U.S. Cl. ................................. 292/80; 292/DIG. 38
[58] Field of Search ........................ 292/87, 80, DIG. 38, 292/DIG. 55, 219

[56] References Cited

U.S. PATENT DOCUMENTS

| | | | |
|---|---|---|---|
| 545,778 | 9/1895 | Cough | 292/87 |
| 2,443,702 | 6/1948 | Bruning | 292/87 |
| 4,096,856 | 6/1978 | Smith et al. | 607/5 |
| 4,113,217 | 9/1978 | O'Connell | 292/87 |
| 4,578,628 | 3/1986 | Siwiak | 320/2 |
| 4,688,023 | 8/1987 | McGill et al. | 292/87 |
| 4,714,284 | 12/1987 | Varlet | 292/DIG. 38 |
| 4,741,461 | 5/1988 | Williamson et al. | 292/DIG. 38 |
| 4,879,883 | 11/1989 | Bruner | 292/87 |
| 5,248,264 | 9/1993 | Long et al. | 439/347 |
| 5,488,537 | 1/1996 | Heald et al. | 292/87 |

Primary Examiner—Rodney M. Lindsey
Attorney, Agent, or Firm—Jenkens & Gilchrist

[57] ABSTRACT

A locking fastener for an enclosure cover includes base and cover components. The base includes a pair of L-shaped flanges disposed on an internal surface of the base and a notch formed in the internal surface of the base. The cover includes a plate beam having ends that engage the L-shaped flanges of the base when the cover is assembled with the base. The plate beam also includes a tab that forcibly engages the notch in the in base when the cover is assembled with the base. The locking cover arrangement provides an economical and effective arrangement for permanently securing a cover over an opening.

4 Claims, 3 Drawing Sheets

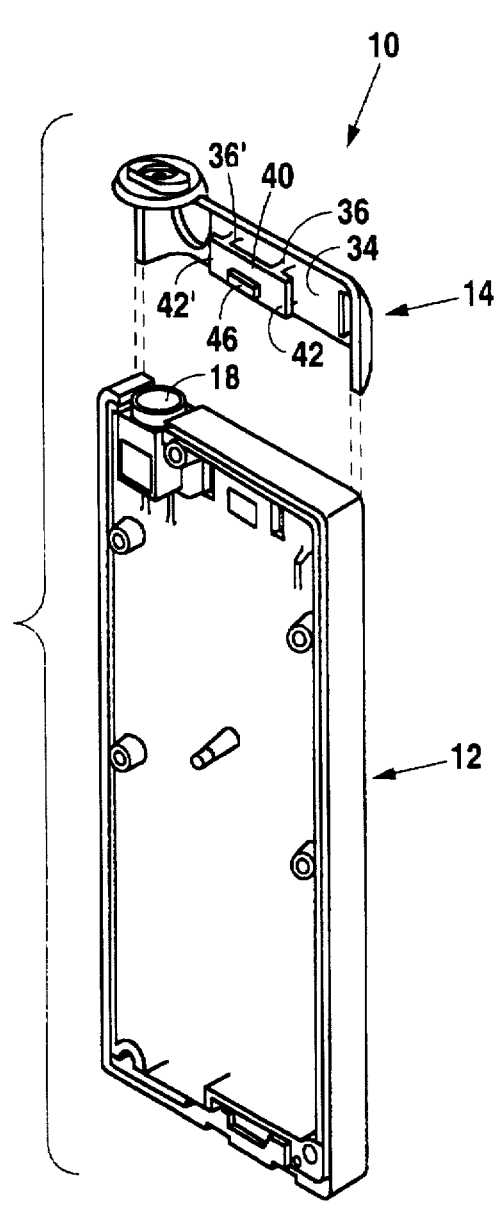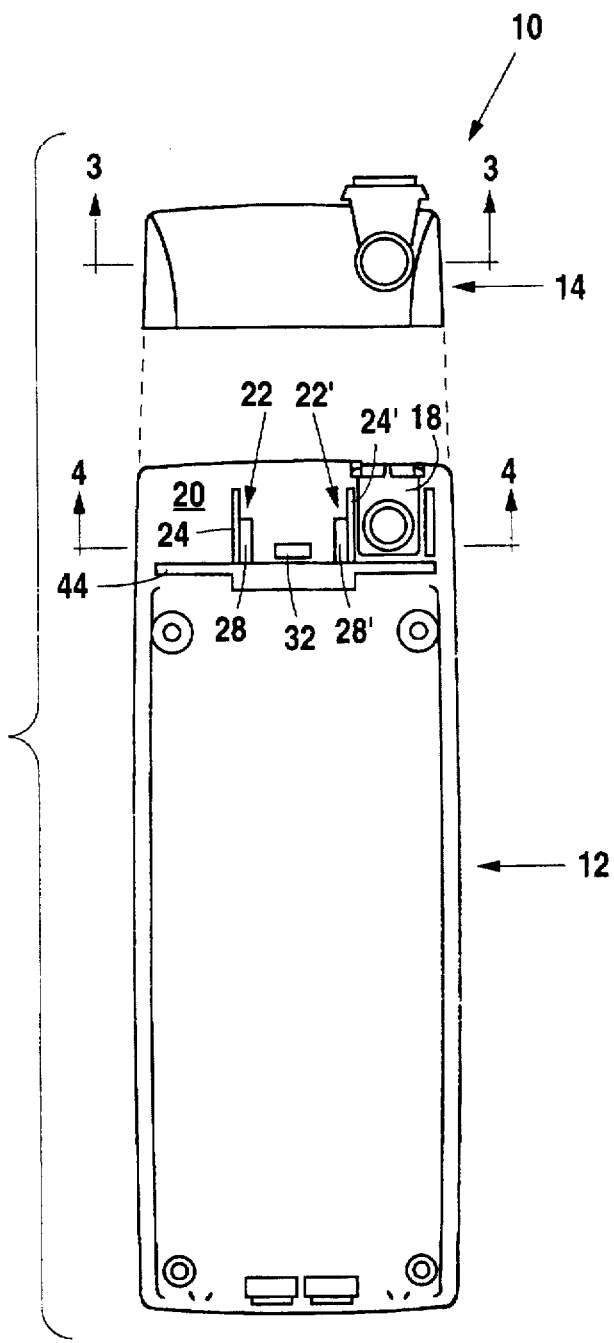
Fig. 1
Fig. 2

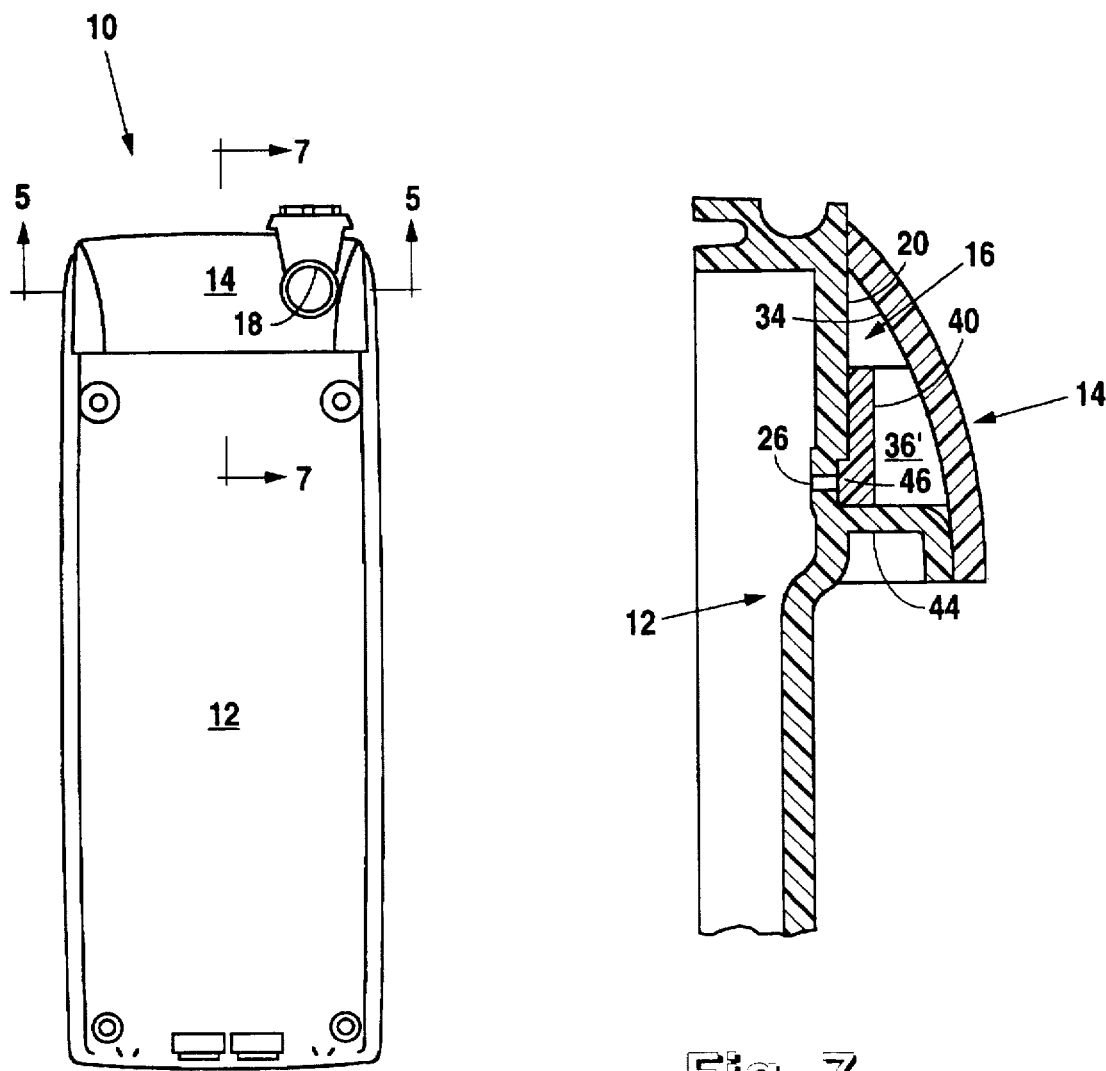
Fig. 6
Fig. 7
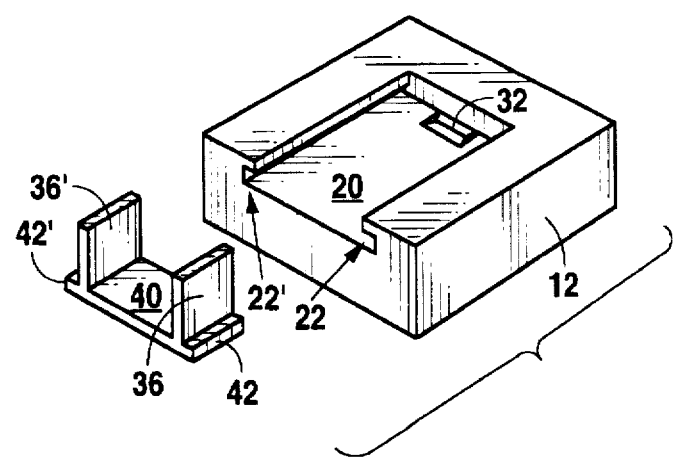
Fig. 8

5,704,660

LOCKING FASTENER FOR ENCLOSURE COVER

BACKGROUND OF THE INVENTION

1. Technical Field

This invention relates to an enclosure cover having a locking fastener feature to secure the cover to a mating base, and more particularly to a locking fastener having a plate beam with cantilevered ends that engage respective slots provided on an interior surface of the base.

2. History of Related Art

Lockable covers are typically used during final assembly of a multiple-component manufactured article to complete the closure of access cavities or installation openings necessary for the installation of components during earlier steps of an assembly process. Such enclosure covers generally have two purposes; to hide and protect internally installed components, and provide an aesthetically pleasing external appearance. It is often desirable that such covers be locked in place after assembly, i.e., that the covers not be readily separable from the mating part without the use of special tools or force of such magnitude as to potentially break or damage the assembled cover or mating pan.

For example, it is desirable that certain internal components of many articles, from electronic instruments to children's toys, not be readily accessible to prevent accidental damage to critical electrical circuits in the hands of inexperienced adults, or tempt destruction by an inquisitive child. For example, adhesive bonding tape has been used heretofore to secure a cover over an internal antenna support mounted on the frame of a cellular phone. High strength adhesive bonding tape fixably attaches the cover to the frame with sufficient force to prevent removal of the cover without the use of considerable force, which may be somewhat reduced by the application of heat to the adhesive. However, this arrangement for attaching cover components results in additional material, order of assembly and processing requirements, all of which contribute to increased manufacturing costs. For proper adhesion, adhesive bonding tapes require clean surfaces, the application of significant mounting force, and the maintenance of sufficient dwell time while applying the mounting force. Because of the difficulty of bonding adhesive tape to many plastic surfaces, metallic or specific plastic materials are required for the construction of components joined by adhesive bonding tape. Also, if the cover is installed in a misaligned position with respect to the mating frame, i.e., if it is not fully seated or has a visible gap between the cover and frame, the cover is difficult to remove and reattach. Furthermore, in certain adverse environments, the adhesive bond may be adversely affected and fail.

The present invention is directed to overcoming the problems set forth above. It is desirable to have a lockable enclosure cover arrangement provided by integrally formed respective mating components that do not require additional materials or processing steps for final assembly. It is also desirable to have such a cover that is self-aligning with a mating base during assembly, and can be easily installed by the application of a unidirectional force thereby facilitating the use of automated assembly techniques. It is also desirable to have a lockable cover for an enclosure that can be installed on a metal or plastic base without compromising the composition of the frame material to accommodate adhesive bonding.

SUMMARY OF THE INVENTION

In accordance with one aspect of the present invention, a locking fastener for an enclosure cover includes base and cover components. The base includes a pair of L-shaped flanges that extend outwardly from an internal surface of the enclosure and includes a wall on each flange that is disposed in horizontal relationship with, and spaced a predetermined distance from, the internal surface of the base. The base also has a predefined notch that extends inwardly from the internal surface of the base. The cover includes a plate beam having two ends that have a thickness substantially equal to the distance that the aforementioned flange walls of the base are spaced from the interior surface of the base. The plate beam also includes a tab that forcibly engages the notch in the base when the cover is assembled with the base. The plate beam also abuts the internal surface of the base when the cover is assembled with the base.

In another aspect of the present invention, the plate beam of the locking fastener for an enclosure cover is supported by a pair of struts the respectively extend from the internal surface of the cover. The plate beam has cantilevered ends that overhang the supporting struts. In a preferred embodiment, the base of the locking fastener provides a frame for a cellular telephone, and the cover provides an antenna housing cover that is adapted to mate with the frame.

BRIEF DESCRIPTION OF THE DRAWINGS

A more complete understanding of the structure of the locking fastener for an enclosure cover may be had by reference to the following detailed description when taken in conjunction with the accompanying drawings, wherein:

FIG. 1 is an isometric view of the base and cover components of a locking fastener arrangement embodying the present invention, showing the components from a rear view in separated, spaced relationship prior to assembly;

FIG. 2 is a front elevational view of the base and cover components of a locking fastener arrangement embodying the present invention, showing the components in separated, spaced relationship prior to assembly;

FIG. 6 is a front elevational view of the base and cover components of the locking arrangement embodying the present invention, showing the base and cover components after assembly;

FIG. 7 is a sectional view of the assembled base and cover components of the locking fastener arrangement embodying the present invention, taken along the line 7—7 of FIG. 6; and FIG. 8 is a schematic representation of the locking fastener arrangement embodying the present invention.

DETAILED DESCRIPTION OF A PRESENTLY PREFERRED EXEMPLARY EMBODIMENT

Figure 3:
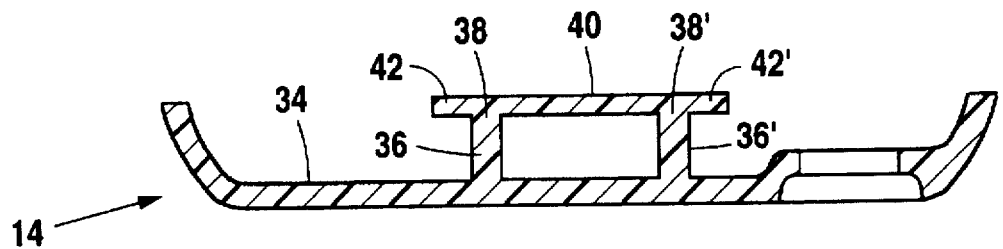
FIG. 3 is a sectional view of the cover component of the locking fastener arrangement embodying the present invention, taken along the line 3—3 of FIG. 2.

In the preferred embodiment of the present invention, a cellular telephone 10 has a frame, or base 12 and a cover 14 that is adapted to enclose a chamber 16. In the illustrated arrangements, the chamber 16 accommodates an antenna housing 18 and, if desired, an antenna RF switch or similar components, not shown.

Figure 4:
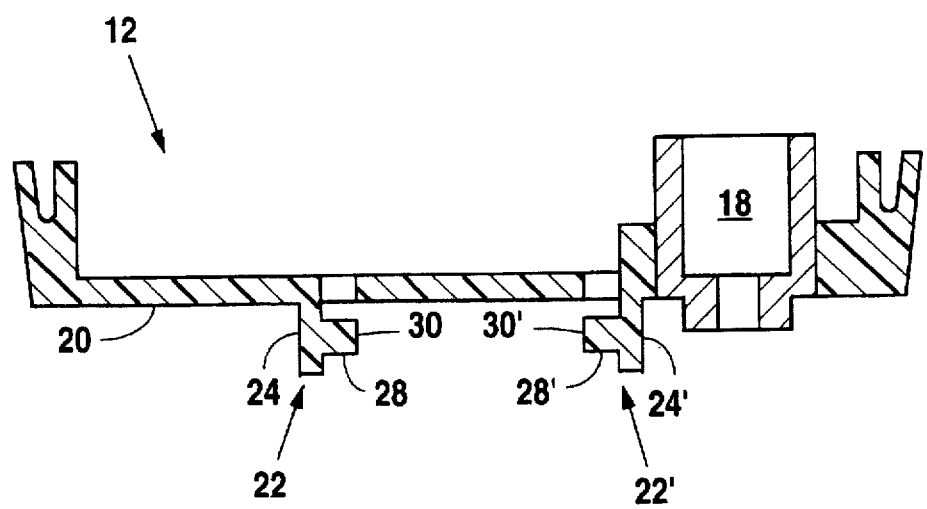
FIG. 4 is a sectional view of the base component of the locking fastener arrangement embodying the present invention, taken along the line 4—4 of FIG. 2.
Figure 5:
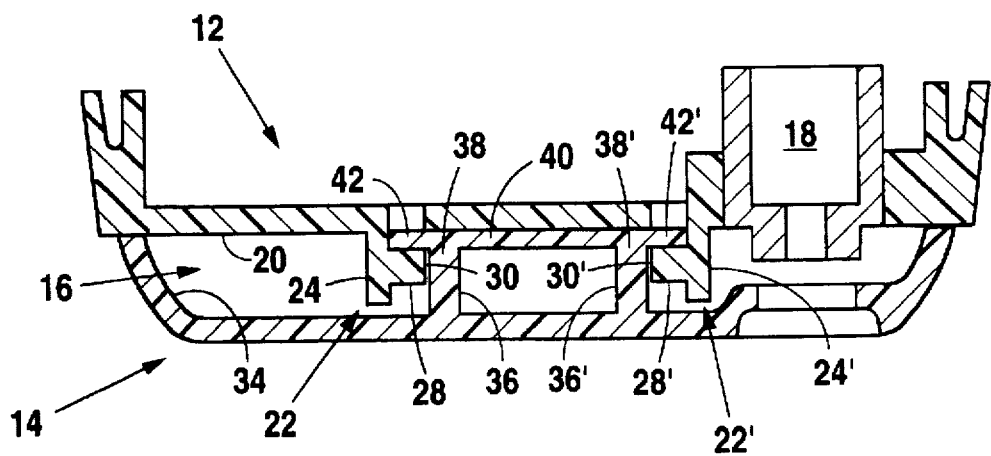
FIG. 5 is a sectional view of the assembled base and cover components of the locking fastener arrangement embodying the present invention, taken along the line 5—5 of FIG. 6.

As shown in FIGS. 2, 4, 5 and 7, the frame 12 has a first surface 20 that defines a portion of the enclosure 16. A pair of L-shaped flanges 22,22' each have a first wall 24,24' that is spaced from each other at a predetermined first distance and extend outwardly in a substantially perpendicular direction from the first surface 20 of the frame 12. A respective pair of second walls 28,28' extend respectively from the first walls 24,24' in substantially parallel spaced relationship with the first surface 20 of the frame 12 at a predetermined second distance. Each of the second walls 28,28', have a respective distal end 30,30' that is spaced from each other at a predetermined third distance.

An inwardly extending indentation, or notch 32 is formed in the first surface 20 of the frame 12, and is desirably positioned about midway between the first walls 24,24' of the L-shaped flanges 22,22'.

The enclosure cover 14 has an overall shape adapted to mate with the base and provide a complimentary outer shape for the cellular telephone 10. The cover 14 has a predefined internal, or second, surface 34 that cooperates with the first surface 20 of the frame 12 to define the enclosure 16 when the cover is attached to the frame 12. In the preferred embodiment, the cover 14 as a pair of struts 36,36' that respectively extend from the second surface 34 of the cover 14 in a spaced apart relationship that is less than the predetermined third distance at which the distal ends 30,30' of the second walls 28,28' are spaced. Desirably, the surfaces of the struts 36,36' that face away from each other are spaced apart at about the same distance as the distal ends 30,30' of the second walls 28,28' so that upon assembly, the struts 36,36' will slide between the distal ends 30,30'. Each of the struts 36,36' have distal ends 38,38' that extend from the second surface 34 of the cover 14 and, upon assembly of the cover 14 with the frame 12, are spaced from the first surface 20 of the frame 12 at the above described second distance at which the second walls 28,28' of the L-shaped flanges 22,22' are spaced from the first surface 20.

The cover 14 further includes a plate beam 40 that is rigidly supported by the distal ends 38,38' of the struts 36,36'. The plate beam 40 has a length substantially equal to the predetermined first distance between the first walls 24,24' of the L-shaped flanges 22,22', and is supported by the distal ends 38,38' of the struts at intermediate positions along its length so that the ends of the plate beam 40 have a pair of spaced apart overhanging, or cantilevered, ends 42,42'. Importantly, the thickness of the cantilevered ends 42,42' of the plate beam 40 is substantially equal to the distance between the second walls 28,28' of the L-shaped flanges 22,22' and the first surface 20 of the frame 12.

Alternatively, the plate beam 40 may be supported by a single strut 36 extending from the second surface 34 of the cover 14, preferably at a mid-point between the cantilevered ends 42,42' of the beam 40. Also, if desired, the plate beam 40 may directly extend from the second surface 34 of the cover 14, for example from a position adjacent the top of the cover 14.

Thus, it can be seen that the L-shaped flanges 22,22' of the frame 12 are constructed to provide a T-slot for guiding and receiving the cantilevered ends 42,42' of the strut-supported plate beam 40 affixed to the cover 14, and maintaining the plate beam 40 in tight abutment against the predefined first surface 20 of the frame 12. Engagement of the beam ends 42,42' with the slots of the flanges 22,22' is conveniently carried out by simply sliding the cover 14 downwardly, while holding the cover 14 against the frame 12, until the bottom of the plate beam 40 abuts a transverse wall 44 extending across the frame 12.

Importantly, the plate beam 40 has an outwardly extending tab 46, positioned about midways between the cantilevered ends 42,42' and adjacent the bottom of the beam 40, that is adapted to engage the inwardly extending notch 32 formed in the first surface 20. Thus, when the plate beam 40 is seated in the flanges 22,22' with the bottom of the plate beam 40 in abutting contact with the transverse wall 44, the tab 46, urged by the plate beam 40, snaps into forced engagement with the notch 32.

In order to unlock the engagement of the tab 46 with the notch 32 it is necessary to deflect, or bend, the intermediate portion of the plate beam 40 away from the first surface 20 of the frame 12. As can be readily seen, after the cover 14 is assembled on the frame 12, the plate beam is essentially inaccessible. Depending on the material composition of the cover 14, it may be possible to insert a thin blade between the transverse wall 44 and the second surface 34 of the cover, and twist the blade to cause sufficient deformation of the plate beam 40 to separate the tab 46 from the notch 32. However, this action may damage the cover 14, particularly the cantilevered ends 42,42' of the beam 40. Alternatively, a small hole 26 that extends through the first surface 20 from the rear of the frame 12, as shown in FIG. 7, could provide an aperture through which a small pin could be inserted to push the tab 46 away from engagement with the notch 32.

The cantilevered beam and T-slot arrangement of the locking fastener comprising the present invention is illustrated in simplified schematic form in FIG. 8. As can be seen from the diagram, engagement of the cantilevered ends 42,42' of the plate beam 40 into the slots provided by the flanges 22,22' is accomplished by unidirectional translation of the plate beam 40 toward the base 12. During insertion, the tab 46, positioned on the under side of the beam 40 and therefor not visible in the schematic diagram, deforms the intermediate portion of the plate beam 40 sufficiently to allow the tab to slide over the interior surface 20 of the base 12 and, when fully aligned, snap into engagement with the notch 32.

Thus, it can be seen that the locking fastener arrangement embodying the present invention may be described as a blade 40 attached to the cover 14 that translates through a single axis into engagement with a T-slot geometry 22,22' provided in a base 12 over which the cover 14 is to mounted. The blade 40 has a raised locking pad 46 which mates to a corresponding pocket 32 in the base 12 to provide a locking feature. In the start and end positions, none of the components are stressed, preventing creep which could affect long-term performance. During the installation translation motion, the pad 46 and slots 22,22' provide nominal interference which is at least partially relieved by bending of the blade 40 until the pad 46 reaches the pocket 32, thereby locking the cover 14 to the base 12.

The locking fastener arrangement embodying the present invention is also blind, i.e., it is self-locating, and provides a single-axis push-on installation ideally suited for automated assembly operations. Advantageously, the locking fastener arrangement does not require rotating movement or compression of a feature to install. All interlocking components of the fastener structure are disposed internally within the enclosed chamber and are thus hidden from view or access, and provide resistance to translation or rotation in any direction. Importantly, no additional elements, components or parts are needed to provide a permanent attachment of the enclosure cover 14 to the base 12. Importantly, the snap fit feature of the locking fastener arrangement embodying the present invention ensures a tight fit between mating components.

The frame 12 and the cover 14 of the cellular telephone 10 are desirably formed by conventional molding techniques. The frame 12 is preferably formed of a strong, rigid material having high impact and tensile strength. For example, it has been found that the frame 12 of the cellular telephone 10 illustrating the exemplary embodiment of the present invention is advantageously formed of a thermoplastic polysulfone such as Udel® produced by Amoco. The antenna housing 18, a preformed zinc die casting, is advantageously prepositioned in the mold prior to injection of the polysulfone thermoplastic, and thus is encapsulated as an integral component of the frame 12. Alternatively, the frame 12 may be formed of magnesium or other suitable metallic material.

Desirably, the cover 14 is formed of a strong, rigid, moldable material having high impact and tensile strength, and yet able to provide sufficient deflection characteristics so that the plate beam 40 may be sufficiently deflected by the tab 46, without breaking or cracking, to permit engagement of the cantilevered ends 42,42' of the beam 40 into the T-slot formed by the spaced flanges 22,22' on the base 12 during assembly. The antenna mounting support cover 14 of the illustrative cellular telephone 10 is preferably formed of an ABS/polycarbonate blend such as CYCOLOY® produced by the GE Plastics division of General Electric Company.

Although the present invention is described in terms of a preferred exemplary embodiment, those skilled in the art will recognize that changes in material, shape of the cover and base components 14,12 and specific geometry of the T-slots 22,22', the mating cantilevered beam ends 42,42', and the support struts 36,36' may be made, providing that the essential respective positional relationships described herein are met, without departing from the spirit of the invention. For example, the locking fastener arrangement embodying the present invention is readily applicable to other applications where permanent, blind, single-axis, snap-together attachment of mating components is required, such as windows, keyboard inserts, and lightguides in telecommunication equipment. Such changes and other applications of the locking fastener arrangement are intended to fall withing the scope of the following claims. Other aspects, features and advantages of the present invention can be obtained from a study of this disclosure and drawings, along with the appended claims.

What is claimed is:

1. A locking fastener arrangement, comprising:

a base having a predefined first surface defining a portion of an enclosure and a pair of L-shaped flanges spaced from each other in substantially parallel relationship at a predetermined first distance, each of said flanges having a first wall extending in a substantially perpendicular di second wall integrally connected to a distal end of each of the first walls and extending respectively from each of said first walls in substantially parallel spaced relationship with said first surface at a predetermined second distance and in a direction toward each other and having respective distal ends spaced apart from one another at a predetermined third distance, and an inwardly extending notch disposed at a predefined position on said first surface;

a cover adapted for attachment with said base and having a predefined second surface cooperating with said first surface of the base to substantially define an enclosure when the cover is attached to the base, a pair of struts each of which extend from said second surface of the cover at a spaced apart distance less than said predetermined third distance between the distal ends of the second walls of the L-shaped flanges of the base and each of said struts having a distal end spaced from said second surface of the cover at a distance substantially equal to the predetermined second distance at which said second walls of the L-shaped flanges of the base are spaced from said predefined first surface of the base, and a plate beam having an intermediate portion rigidly attached to the respective distal ends of the struts whereby said plate beam is spaced from said second surface of the cover, a pair of cantilevered end portions respectively extending from the intermediate portion and extending beyond the supporting distal ends of said struts, a length substantially equal to the predetermined first distance at which said first walls of the L-shaped flanges of the base are spaced apart, a thickness substantially equal to the predetermined second distance at which said second walls of the L-shaped flanges of the base are spaced from said predefined first surface of the base, a face surface facing outwardly from the predefined second surface of the cover at a distance sufficient to provide abutting contact of said face surface of the plate beam when said cover is attached to said base, and a tab extending outwardly from said face surface of the plate beam and disposed at a position sufficient to forcibly engage said inwardly extending notch disposed on said predefined first surface of the base when said cover is attached to said base.

2. A locking fastener arrangement, as set forth in claim 1, wherein said base comprises a frame for a cellular telephone, and said cover comprises an antenna housing cover adapted to mate with said frame.

3. A locking fastener arrangement, as set forth in claim 1, wherein said cover is attachable to said base in response to slidably engaging the cantilevered ends of the plate beam between the first surface of the base and the second wall spaced from said base, and is securely locked in said attachment by engagement of the tab on the face surface of the plate beam into said inwardly extending notch disposed on the first surface of the base.

4. A locking fastener arrangement, as set forth in claim 1, wherein when said cover is attached to the base, said tab on the face surface of the plate beam is disengagable from said inwardly extending notch disposed on the predefined first surface of the base in response to bending a portion of said plate beam disposed between said cantilevered ends of the plate beam in a direction away from said predetermined first surface of the base.

* * * * *